(12) United States Patent
Lobo et al.

(10) Patent No.: US 7,861,234 B1
(45) Date of Patent: Dec. 28, 2010

(54) SYSTEM AND METHOD FOR BINARY TRANSLATION TO IMPROVE PARAMETER PASSING

(75) Inventors: Sheldon Lobo, Cary, NC (US); Fu-Hwa Wang, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 976 days.

(21) Appl. No.: 11/064,153

(22) Filed: Feb. 23, 2005

(51) Int. Cl.
*G06F 9/45* (2006.01)
(52) U.S. Cl. .................. 717/136; 717/140; 717/152
(58) Field of Classification Search .............. 717/136, 717/140, 153, 148, 151
See application file for complete search history.

(56) References Cited

U.S. PATENT DOCUMENTS

| | | | | | |
|---|---|---|---|---|---|
| 5,469,572 | A | * | 11/1995 | Taylor | 717/152 |
| 5,481,708 | A | * | 1/1996 | Kukol | 717/155 |
| 5,564,031 | A | | 10/1996 | Amerson et al. | 395/419 |
| 5,822,787 | A | * | 10/1998 | Zucker | 711/213 |
| 5,835,743 | A | * | 11/1998 | Zucker | 712/200 |
| 5,923,882 | A | * | 7/1999 | Ho et al. | 717/147 |
| 5,991,871 | A | * | 11/1999 | Zucker | 712/233 |
| 6,047,362 | A | * | 4/2000 | Zucker | 711/203 |
| 6,085,035 | A | * | 7/2000 | Ungar | 717/116 |
| 6,164,841 | A | * | 12/2000 | Mattson et al. | 716/1 |
| 6,289,505 | B1 | * | 9/2001 | Goebel | 717/153 |
| 6,385,764 | B1 | * | 5/2002 | Blandy et al. | 717/127 |
| 6,481,007 | B1 | * | 11/2002 | Iyer et al. | 717/151 |
| 6,502,237 | B1 | * | 12/2002 | Yates et al. | 717/136 |
| 6,594,754 | B1 | * | 7/2003 | Jourdan et al. | 712/217 |
| 6,802,056 | B1 | | 10/2004 | Chaiken et al. | 717/136 |
| 6,895,580 | B2 | * | 5/2005 | Bates et al. | 717/157 |
| 6,941,549 | B1 | * | 9/2005 | Holder et al. | 717/162 |
| 6,993,754 | B2 | * | 1/2006 | Freudenberger et al. | 717/153 |
| 7,086,044 | B2 | * | 8/2006 | Hanson et al. | 717/151 |
| 7,127,592 | B2 | * | 10/2006 | Abraham et al. | 712/217 |
| 7,350,193 | B2 | * | 3/2008 | Belov et al. | 717/114 |
| 7,356,810 | B2 | * | 4/2008 | Souloglou et al. | 717/146 |
| 7,434,209 | B2 | * | 10/2008 | Brown et al. | 717/136 |
| 7,676,799 | B1 | * | 3/2010 | Panchenko et al. | 717/159 |

(Continued)

OTHER PUBLICATIONS

F. Rastello, "Optimizing Translation Out of SSA Using Renaming Constraints", 2004, IEEE, pp. 1-12.*

(Continued)

*Primary Examiner*—Tuan Q. Dam
*Assistant Examiner*—Marina Lee
(74) *Attorney, Agent, or Firm*—Gregory P. Durbin; Polsinelli Shughart PC

(57) ABSTRACT

An application compiled to a binary executable according to a first set of binary interface rules has selected caller/callee pairs that present parameter passing improvement possibilities modified from compliance with the first set of binary interface rules to compliance with a second set of binary interface rules to improve the efficiency of parameter passing, such as by reducing the number of instructions used to pass the parameters. A binary executable search engine searches the binary executable to locate functions having parameter passing improvement possibilities. Identified caller/callee function pairs are updated with a function modifier to pass the parameters more efficiently. Selected of the identified callee functions are cloned so that a cloned function is modified instead of the original function, thus leaving the original function to pass parameters with functions beyond the view of the binary executable search engine.

20 Claims, 4 Drawing Sheets

U.S. PATENT DOCUMENTS

| | | | |
|---|---|---|---|
| 2004/0064809 A1* | 4/2004 | Liu et al. ................... | 717/158 |
| 2004/0194071 A1* | 9/2004 | Tanaka ...................... | 717/136 |
| 2005/0138612 A1* | 6/2005 | Asao .......................... | 717/152 |
| 2005/0188363 A1* | 8/2005 | Moon et al. ................ | 717/157 |
| 2006/0070028 A1* | 3/2006 | Belov et al. ................ | 717/114 |
| 2006/0071933 A1* | 4/2006 | Green et al. ............... | 345/426 |

OTHER PUBLICATIONS

Sutter et al., "Whole-program optimization of binary executable", 2000, SSGRR 2000 Computer & E-Business Conference, pp. 1-9.*

"Developing PowerPC Embedded Applicatioin Binary Interface (EABI) Compliant Programs", Sep. 21, 1998, IBM Research paper, pp. 1-8.*

Aβmann et al. "A RISC Processor Architecture with a Versatile Stack System" published by ACM, 1993, p. 1-8.*

"Solaris 64-bit Developer's Guide", Sun Microsystem, Inc., Jan. 2005, Retrieved from <http://dlc.sun.com/pdf/816-5138/816-5138.pdf>, total pp. 74.*

* cited by examiner

SYSTEM AND METHOD FOR BINARY TRANSLATION TO IMPROVE PARAMETER PASSING

BACKGROUND OF THE INVENTION

1. Field of the Invention

The present invention relates in general to the field of compiling applications to run on a computer platform, and more particularly to a system and method for binary translation to improve parameter passing between compiled functions.

2. Description of the Related Art

Software applications that run on computers are generally written in a development language, such as C++, and then compiled to a binary format adapted to the processor and operating system of the computer platform. Application code compiled to a binary format generally runs more efficiently since the processor and operating system platform faces fewer operations to perform functions defined by the code. Compiler languages typically use a modular design of discrete functions so that, for instance, an application is more easily developed by diverse teams of developers working on discrete modules. Often, a software application consists of several software utilities, known as libraries, which were developed by different software vendors and compiled by different compilers. Indeed, application developers often rely upon development toolkits to provide desired functions so that the developers do not have to "re-invent the wheel" each time a commonly-used function is desired. Development toolkits that are commercially available or that result from a development team's previous work may be used in development of a new application as long as the selected toolkit functions remain compatible with newly-developed functions. Maintaining compatibility between functional application modules saves considerable application development work by allowing developers to rely on existing modules, however, maintaining compatibility over time tends to introduce inefficiencies in the compilation of the application. For instance, a certain amount of "overhead" operations are typically performed to ensure compatibility of modules that may not take advantage of platform hardware and operating system improvements that have occurred in the time since the toolkit modules were developed.

One technique used to ensure compatibility between functional application modules is to define parameters that are used to pass information between functions. Typically, a caller function requests information with a defined parameter from a callee function and the callee function responds with defined parameters that are sent to the caller function. In order to ensure that information is passed correctly between utilities developed by different software vendors, computer platforms on which software applications are deployed typically define an Application Binary Interface ("ABI"). The ABI defines the manner in which parameters are passed between functions, such as through the stack frame or in registers, however, the ABI does not necessarily use the most efficient way to pass parameters for an overall application. Rather, compilers tend to work on individual modules without a whole-program view that sometimes exposes more optimal parameter passing possibilities. Generally, in order to determine the most efficient parameter passing possibilities, a compiler has to review an application as a whole instead of as separate and individual modules, otherwise all caller and callee functions are not visible to the compiler. Frequently, however, toolkit modules are compiled to binary format before combination into an application so that the application uses ABI defined parameter passing for the platform to ensure compatibility of all modules. If an application programmer elects to generate code with calling conventions for passing parameters that are different from those defined by the ABI, the programmer typically must manually review all caller and callee function pairs to ensure that consistent parameter passing assumptions are used or the compiled application will fail.

SUMMARY OF THE INVENTION

Therefore a need has arisen for a system and method which analyzes a whole program view of a binary executable to locate and modify selected parameter passing functions to provide improved efficiency at execution of the compiled application.

In accordance with the present invention, a system and method are provided which substantially reduce the disadvantages and problems associated with previous methods and systems for compiling an application. A binary executable compiled in accordance with a first set of binary interface rules is searched for selected caller/callee pairs that present parameter passing improvement possibilities identified for modification by an updated second set of binary interface rules. The binary executable is modified according to the second set of binary interface rules so that the selected parameter passing functions execute with improved efficiency defined by the updated set of binary interface rules.

More specifically, a compiler accepts a binary executable compiled according to a first set of binary interface rules, such as the ABI for the SPARC V8 or SPARC V9. A binary executable search engine searches the binary executable to locate selected caller/callee pairs that present parameter passing improvement possibilities for modification according to a second set of binary interface rules. A function modifier modifies the selected parameter passing functions to pass parameters according to an updated second set of binary interface rules that use reduced numbers of instructions to pass the parameters. A function cloner clones callee functions having caller functions that are not fully accessible to the function modifier so that a clone of the callee function is modified while the original callee function remains available to unmodified caller functions. In one embodiment, floating point parameter passing functions that pass floating point parameters through integer registers are modified to pass floating point parameters through floating point registers by deleting store-load instructions to instead rely on a move instruction. In an alternative embodiment, struct or union parameter passing functions that pass struct or union parameters with a pointer and store-load instructions are modified to pass the struct or union parameters with a move instruction through integer or floating point registers. The transformation of the binary executable from the instruction convention of the first set of binary interface rules to the instructions of the second set of binary interface rule improves execution of the application by passing the parameters with a reduced number of instructions.

The present invention provides a number of important technical advantages. One example of an important technical advantage is that a whole program view of an application binary executable allows modification of parameter passing functions to improve efficiency of execution of the application. Modification of parameter passing functions in the binary executable itself allows transformation of the functions from less efficient conventions of defined binary interface rules to the more efficient conventions of an updated set of binary interface rules. The more efficient conventions of the updated set of binary interface rules pass the parameters with fewer instructions, thus requiring reduced overhead during execution of the application. Automated search of and modification to the binary executable ensures that caller and callee pairs associated with passing selected parameters will have the same assumptions about the parameter passing conventions without manual intervention by an application designer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In order to improve the efficiency parameter passing between modules of an application, a whole program view of the application in binary executable is analyzed. Caller/callee pairs that present parameter passing improvement possibilities are located from the whole program view of the binary executable that offer the possibility of improved parameter passing efficiency. For instance, parameter passing functions are analyzed to locate caller and callee pairs that use a greater number of instructions to pass parameters than is necessary in order to maintain compliance with the set binary interface rules that define parameter passing for the relevant platform. The identified parameter passing functions are modified in the binary executable to comply with an updated set of binary interface rules that user fewer instructions than the original platform binary interface rules. Cloning of callee functions to support modification allows the original and unmodified callee function to remain available to caller functions that are outside of the binary executable or otherwise not modified. Automated review and modification of the binary executable provides enhanced application performance with a reduced number of instructions used to pass parameters between modified caller and callee functions.

Figure 1:
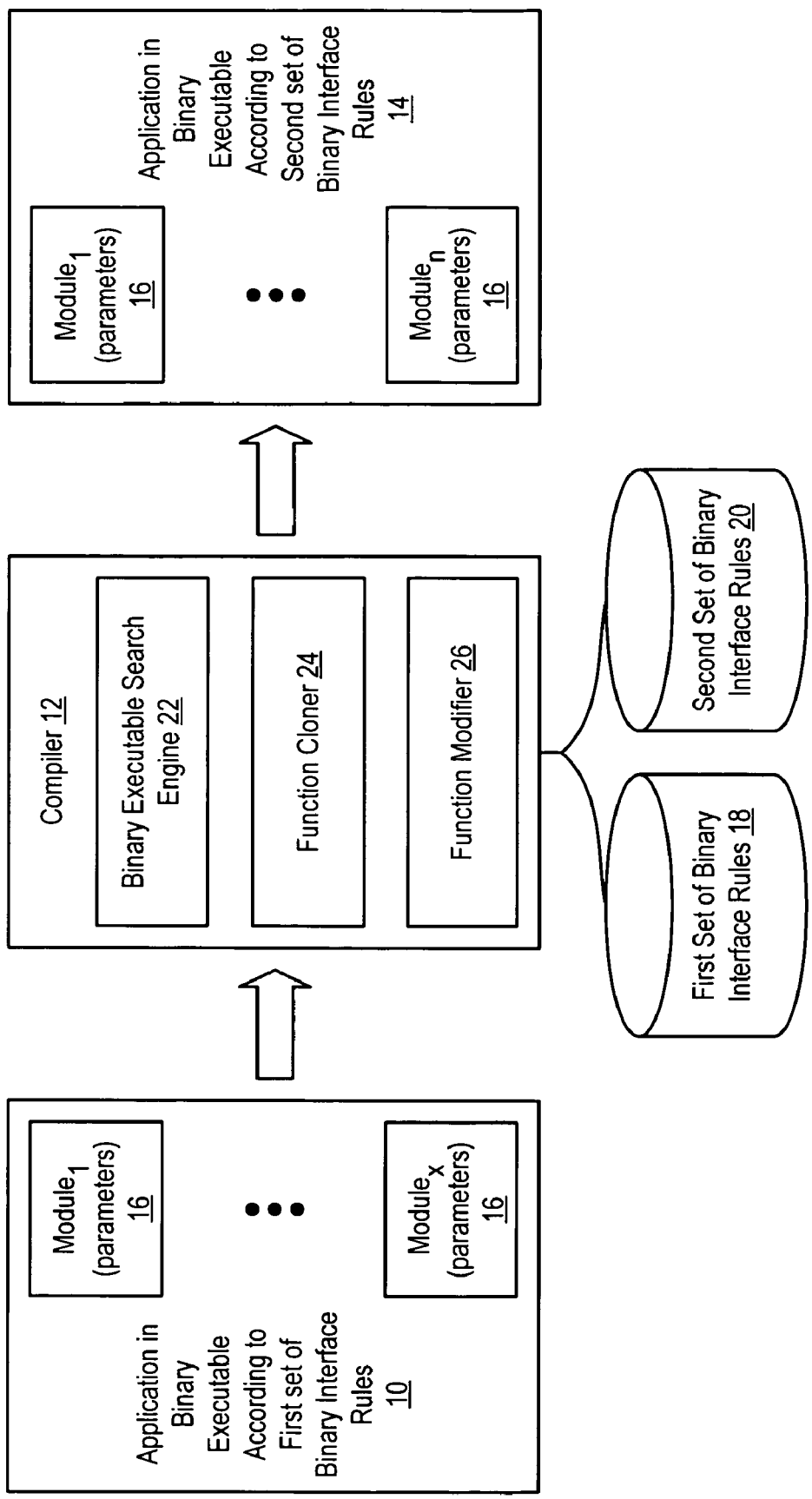
FIG. 1 depicts a block diagram of a system for optimizing parameter passing of an application in binary executable form.

Referring now to FIG. 1, a block diagram depicts a system for optimizing parameter passing between functions of an application 10 compiled in binary executable form according to a first set of binary interface rules 18. Application 10 is analyzed and modified by a compiler 12 to improve parameter passing of application 10 with generation of an application 14 in binary executable form according to a second set of binary interface rules 20. The first and second set of binary rules define instructions for passing parameters between modules 16, such as between caller and callee functions within modules 16. The second set of binary rules 20 provides instructions to pass parameters that use fewer steps and thus less computing power than the instructions used by the first set of binary interface rules. Thus, the second set of binary interface rules 20 generally mirror the first set of binary interface rules 18 except for updates associated to parameter passing functions that provide improved performance of application 14 over application 12 when running on a platform, such as updates that take advantage platform improvements.

Compiler 12 accepts application 10 as a binary executable and searches the whole program view for selected caller/callee pairs that present parameter passing improvement possibilities. For instance, binary executable search engine 22 searches the binary executable for selected caller/callee pairs based on the updates available by application of the second set of binary interface rules 20. Once a caller/callee pair is identified, a function cloner 24 clones a duplicate of the callee function. The original callee function remains unmodified to handle those cases in which not all caller functions to the callee function will be modified, while a function modifer 26 modifies the cloned callee function and accessible caller functions to pass parameters with the more efficient second set of binary interface rules. For instance, if a function is invoked by an indirection rather than an explicit call or if a call occurs outside the scope of the binary executable from a shared library, then the original and unmodified function remains available for these circumstances. Function modifier 26 then modifies caller functions associated with the callee function to pass parameters according to the second set of binary interface rules 20 and redirects the call to the modified clone callee function, which is modified to accept the parameters according to the second set of binary interface rules 20. Where all caller functions associated with a callee function are visible and modified, only the modified callee function need be maintained.

Figure 2:
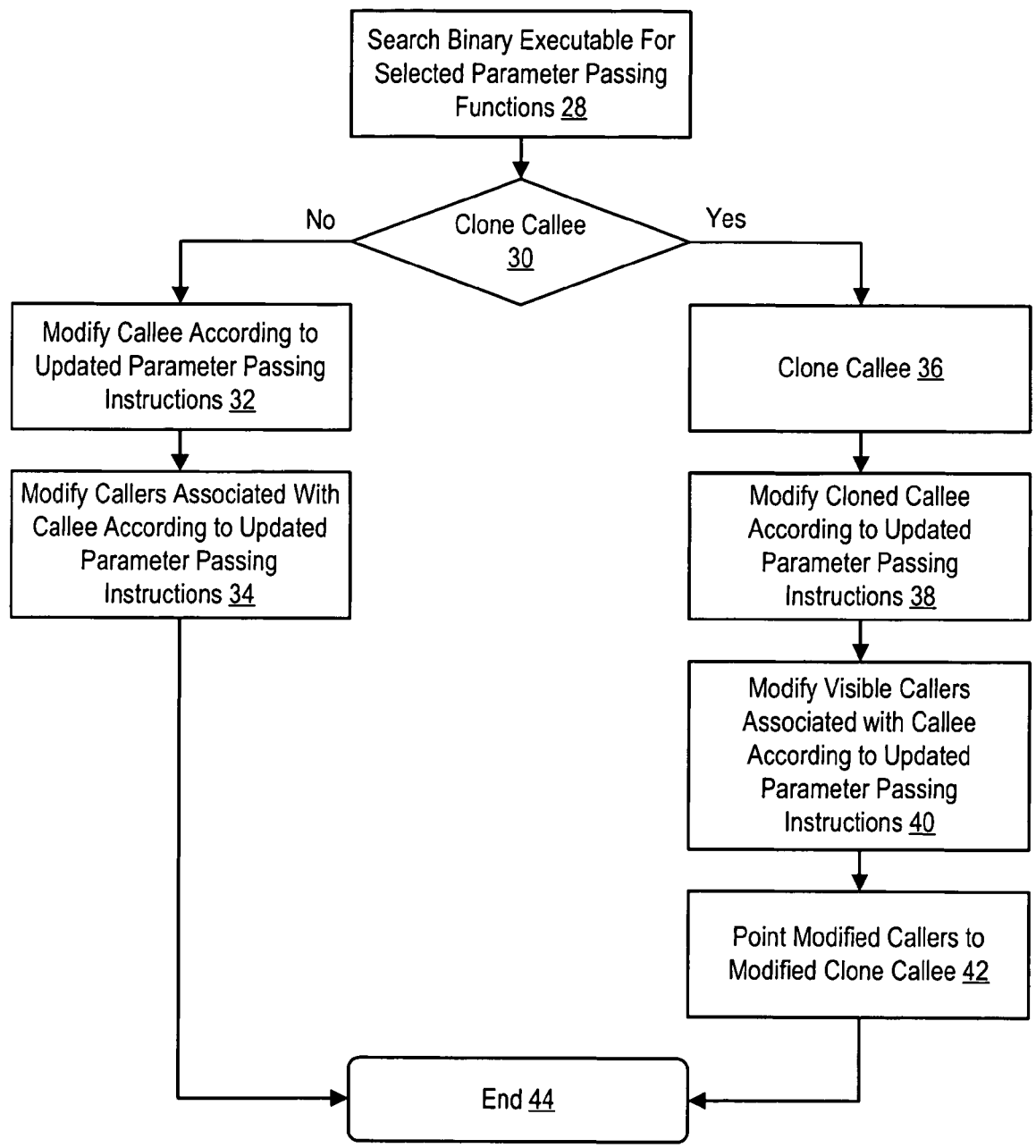
FIG. 2 depicts a flow diagram of a process for optimizing parameter passing of an application in binary executable form.

Referring now to FIG. 2, a flow diagram depicts a process for optimizing parameter passing of an application in binary executable form. The process begins at step 28 with a search of the binary executable for selected parameter passing functions. The search may be for desired functions or parameter variables as represented by the binary executable. At step 30 a determination is made of whether to clone a callee function of a selected caller/callee parameter passing pair found in the binary executable. Cloning is not performed and the process continues to step 32 if the original unmodified callee function is not needed to respond to unmodified caller functions. At step 32, the callee function is modified with updated parameter passing instructions from the updated second set of binary interface rules. At step 34, callers associated with the updated callee function are also updated with the parameter passing instructions so that the callee and caller parameter passing function pair communicate information between the application modules with the updated parameter passing instructions according to the second set of binary interface rules. Once each of the selected function pairs has been found and updated in the application, the process ends at step 44.

In some instances, a determination is made to clone a callee function at step 30, such as when a caller function will not be modified and will need the callee function in an unmodified state to pass parameters. This situation occurs, for instance, when a function is invoked by an indirection rather than an explicit call or when the call occurs outside the scope of the binary executable from a shared library. When an unmodified version of the callee function is needed, the process continues to step 36 at which the callee function is cloned. At step 38, the cloned callee function is modified according to the updated parameter passing instructions of the second set of binary interface rules while the original callee function, remains in an unmodified state. At step 40, those caller functions that are visible in the binary executable and associated with the callee function are modified with the updated parameter passing instructions while the remaining caller functions associated with the callee function are not accessible or otherwise left unmodified. At step 42, the modified caller functions are pointed to the modified cloned callee function to pass parameters with the updated parameter passing instructions while the unmodified caller functions continue to communicate with the unmodified callee function according to the first set of binary interface rules, and the process ends at step 44.

Figure 3:
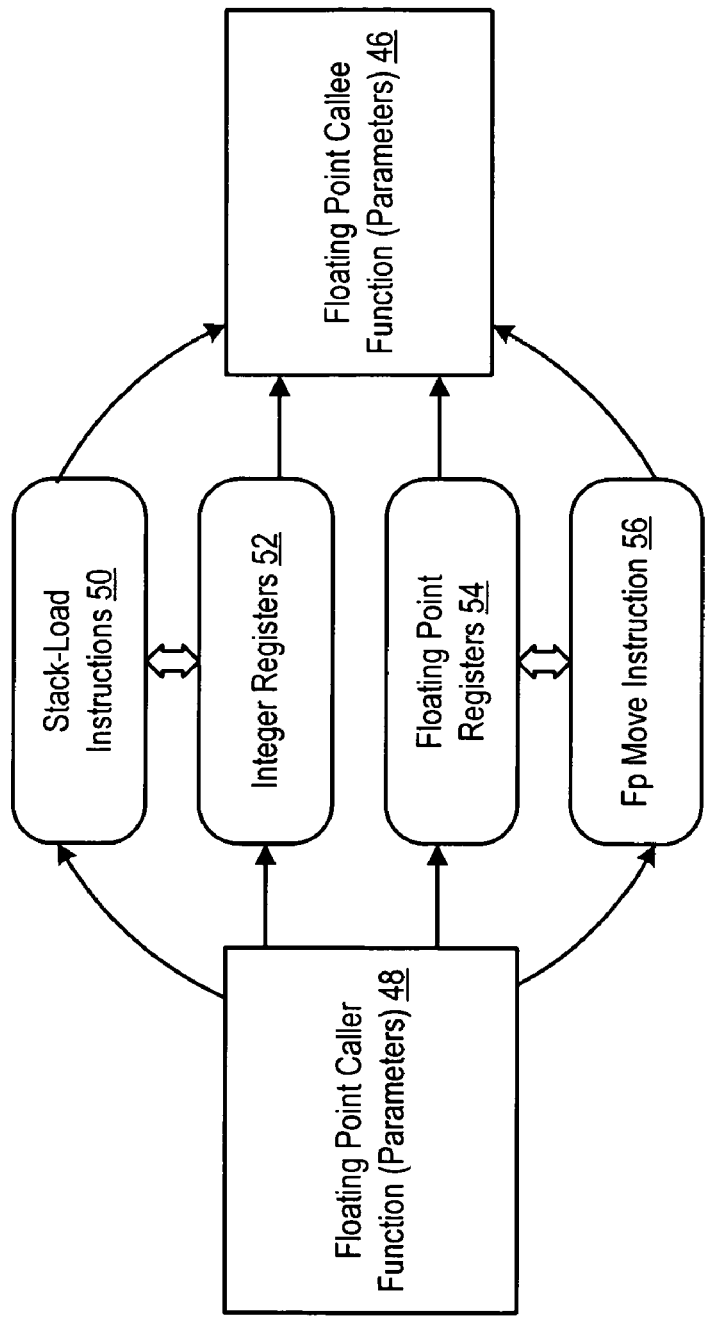
FIG. 3 depicts a functional block diagram of parameter passing alternatives associated with floating point parameters.

Referring now to FIG. 3, a functional block diagram depicts parameter passing alternatives available for optimization of functions associated with passing of floating point parameters. In some instances, the binary interface rules of platforms use integer registers to pass floating point parameters. As an example, the SPARC V8 ABI states that floating point parameters should be passed in integer registers even though floating point registers are available on SPARC V8 platforms. As another example, the SPARC V9 ABI states that floating point parameters should be passed in both the integer and floating point registers for calls where the function prototype does not exist, and that floating point parameters for callee functions corresponding to variable arguments should be passed in the respective integer registers. The use of integer registers to pass floating point values requires a store of the floating point value to the stack and a load of the stack value into the integer register on the caller function side of the parameter passing operation. In addition, similar stack and load instructions are performed on the callee side. By modifying the binary executable to pass floating point parameters through floating point registers, a floating point move instruction is used with less overhead than that associated with stack and load instructions. Performing parameter passing with fewer instructions improves the efficiency and speed with which the compiled application will run on the platform.

FIG. 3 depicts a floating point callee function 46 which complies with the SPARC V8 ABI by passing parameters of function 46 with store/load instructions 50 and integer registers 52. An updated ABI floating point parameter passing convention allows floating point parameters to be passed in floating point registers 54 with a floating point move instruction. For each floating point parameter modified with the updated ABI, a store-load pair of instructions 50 is replaced with a single floating point move instruction so that a transformation of a caller/callee pair replaces four instructions with two. FIG. 3 also depicts a callee function 46 and a caller function 48 for passing floating point parameters compliant with the SPARC V9 ABI under various situations. Where a function prototype does not exist, the V9 ABI has both integer registers 52 and floating point registers 54 used to pass floating point parameters. An updated ABI for the V9 ABI deletes the instructions to store and load the floating point arguments to integer registers at the caller site, reducing by two the instructions associated with each floating point parameter. The function modifier checks each no-prototype callee function to ensure that floating point arguments are accepted with no change required at the callee function. For callee functions with variable arguments the V9 ABI passes floating point parameters corresponding to variable arguments in the respective integer registers. The updated ABI reduces the number of parameter passing instructions by cloning the callee and deleting instructions relating to moving from integer to floating point registers. This modification replaces a pair of stack-load instructions with a single floating point move instruction at the caller site and the callee site, thus replacing four instructions with two for each floating point parameter modified.

Figure 4:
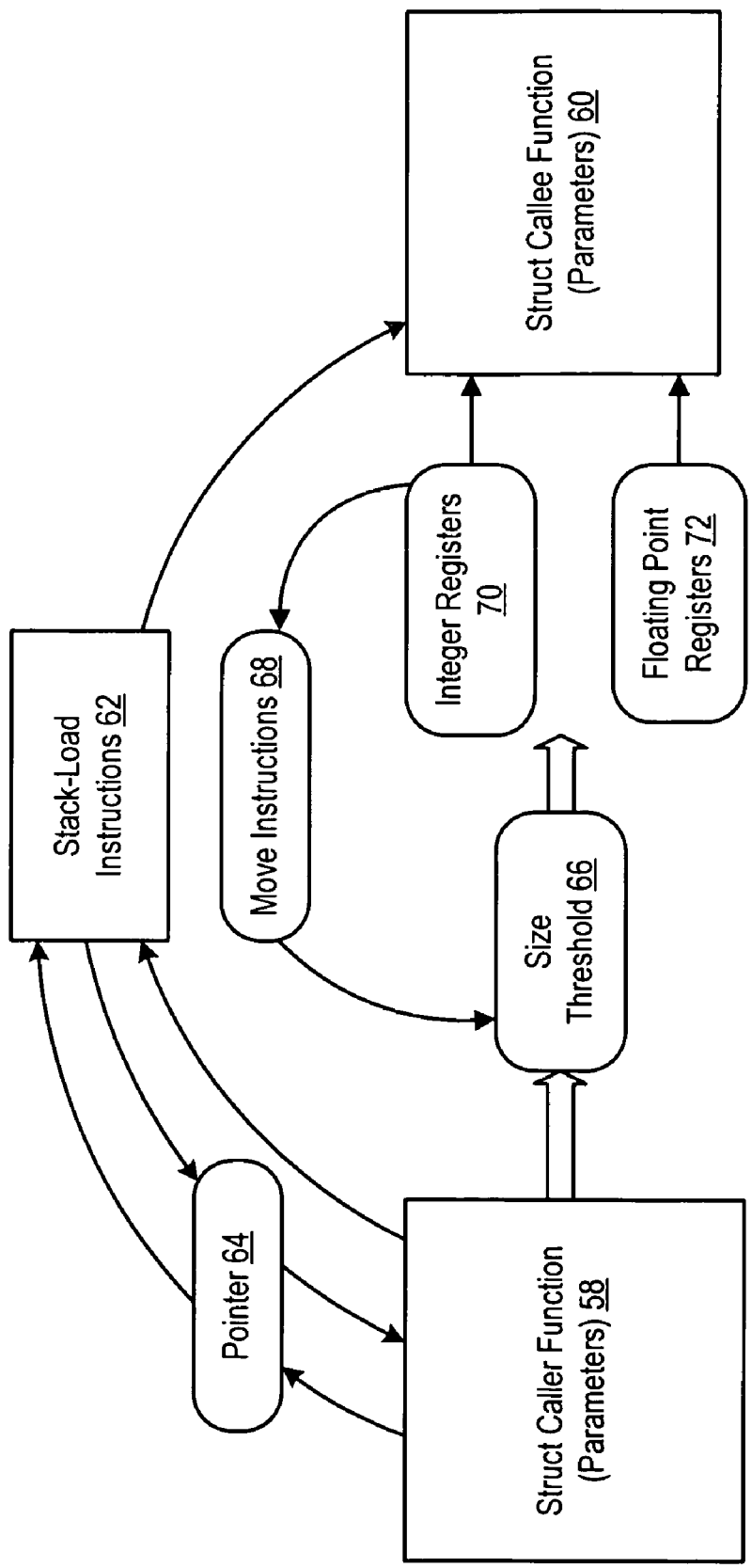
FIG. 4 depicts a function block diagram of parameter passing alternatives associated with struct or union parameters.

Referring now to FIG. 4, a functional block diagram depicts parameter passing alternatives available for optimization of functions associated with the passing of struct or union parameters. In some instances, such as with the SPARC V8 ABI, the binary interface rules of platforms pass struct or union parameters by reference, meaning that the struct or union is stored on the stack and a pointer to the variable is accepted by the callee from the caller. FIG. 4 depicts a struct callee function 60 which stores a parameter with store-load instructions and communicates the position of the parameter to a struct caller function 58 with a pointer 64. The use of a pointer is not necessary where the struct or union parameter is small enough to pass through either integer registers 70 or floating point registers 72. An updated ABI reduces overhead associated with passing struct or union parameters by modifying the binary executable to pass struct and union parameters through integer registers 70 or floating-point registers 72 with a move instruction 68 at the caller 58. Modification with an updated struct or union parameter passing convention is performed if the size threshold 66 indicates that the parameter is small enough to pass through the registers, otherwise the stack-load instructions are maintained. Where the updated ABI allows modification, a store-add pair of instructions are deleted and replaced with a move instruction so that three instructions are replaced by two for each modification.

Although the present invention has been described in detail, it should be understood that various changes, substitutions and alterations can be made hereto without departing from the spirit and scope of the invention as defined by the appended claims.

What is claimed is:

1. A method for compiling an application having plural modules, the method comprising:

compiling the modules to a binary executable according to a first set of binary interface rules, the modules having one or more sets of associated caller and callee function pairs, each pair operable to pass parameters utilizing instructions defined by the first set of binary interface rules, the first set of binary interface rules define the manner in which parameters are passed between functions;

selecting one or more of the caller and callee function pairs for updating;

searching the binary executable to locate the selected caller and callee function pairs; and modifying at least some of the selected caller and callee function pairs in the binary executable to pass the parameters utilizing instructions defined by a second set of binary interface rules, the second set of binary interface rules define the manner in which parameters are passed between functions, wherein passing the parameters utilizing the instructions defined by the second set of binary interface rules utilizes fewer instructions than passing the parameters utilizing the instructions defined by the first set of binary interface rules.

2. The method of claim 1 further comprising:

cloning a selected callee function;

determining that at least one non-updateable caller function associated with the selected callee function will pass parameters according to the first set of binary interface rules; and modifying the cloned callee function to accept parameters according to the second set of binary interface rules; and maintaining the callee function to accept parameters with the non-updateable caller function according to the first set of binary interface rules.

3. The method of claim 2 wherein the non-updateable caller function comprises a function invoked by an indirection.

4. The method of claim 2 wherein the non-updateable caller function comprises a function from a library outside the binary executable.

5. The method of claim 1 wherein modifying at least some of the selected caller and callee function pairs further comprises:
    modifying a callee function to accept floating point parameters in floating point registers instead of integer registers; and
    modifying a caller function associated with the modified callee function to pass floating parameters in floating point registers instead of integer registers.

6. The method of claim 5 wherein:
    modifying a callee function to accept floating point parameters further comprises replacing a store load instruction of the-callee function with a floating point move instruction; and
    modifying a caller function to pass floating point parameters further comprises replacing a store-load instruction of the caller function with a floating point move instruction.

7. The method of claim 1 wherein modifying at least some of the selected caller and callee function pairs further comprises:
    determining that the first set of binary interface rules pass floating point parameters in both integer and floating point registers;
    determining that a callee function accepts floating point arguments;
    modifying the caller function by deleting store-load instructions associated with the passing parameters to the integer registers.

8. The method of claim 1 wherein modifying at least some of the selected caller and callee function pairs further comprises:
    determining that a struct parameter is smaller than a threshold value;
    deleting from a caller function associated with the struct parameter instructions to save the struct parameter to the stack frame in the caller function;
    inserting instructions in the caller function to pass the struct parameter to a register; and
    modifying a callee function associated with the struct parameter to accept the struct parameter from the register.

9. A system for modifying parameter passing of functions within an application, the application in binary executable format, the system comprising:
    a binary executable search engine operable to search the binary executable format compiled according to a first set of binary interface rules to find predetermined caller and callee pairs that pass parameters utilizing instructions defined by the first set of binary interface rules, the first set of binary interface rules define the manner in which parameters are passed between functions;
    a function modifier operable to modify at least some of the selected caller and callee function pairs in the binary executable to pass the parameters utilizing instructions defined by a second set of binary interface rules, the second set of binary interface rules define the manner in which parameters are passed between functions, wherein passing the parameters utilizing the instructions defined by the second set of binary interface rules utilizes fewer instructions than passing the parameters utilizing the instructions defined by the first set of binary interface rules; and
    a processing unit operable to execute at least the binary executable search engine and the function modifier.

10. The system of claim 9 wherein the function modifier modifies the selected caller and callee function pairs by deleting stack-load instructions associated with at least one function.

11. The system of claim 9 wherein the function modifier modifies the selected caller and callee function pairs by inserting instructions to pass parameters to a floating point register.

12. The system of claim 11 wherein the function modifier modifies the selected caller and callee function pairs by deleting instructions to pass parameters in an integer register.

13. The system of claim 9 further comprising a function cloner operable to clone a callee function, the function modifier modifying the cloned function.

14. The system of claim 13 wherein the original function remains in the application to respond to caller functions invoked by an indirection.

15. The system of claim 13 wherein the original function remains in the application to respond to caller functions from a shared library outside of the binary executable.

16. A method for compiling an application, the application in binary executable form compliant with a first set of binary interface rules, the method comprising:
    searching the application binary executable to locate predetermined parameter passing functions that pass parameters utilizing instructions defined by the first set of binary interface rules; and
    replacing selected of the predetermined parameter passing functions with parameter passing functions that pass the parameters utilizing instructions defined by a second set of binary interface rules;
    wherein the parameter passing functions that pass the parameters utilizing instructions defined by the second set of binary interface rules utilize fewer instructions to pass the parameters than the parameter passing functions that pass parameters utilizing instructions defined by the first set of binary interface rules.

17. The method of claim 16 further comprising cloning at least some of the parameter passing functions, wherein the replacing is performed on the cloned function.

18. The method of claim 16 wherein the replacing further comprises deleting stack-load instructions and inserting move instructions.

19. The method of claim 16 wherein replacing further comprises passing parameters through a floating point register instead of an integer register.

20. The method of claim 16 further comprising:
    comparing a parameter with a threshold size;
    maintaining the function associated with the parameter if the parameter exceeds the threshold size.

* * * * *